United States Patent
Yue et al.

(10) Patent No.: US 12,398,042 B2
(45) Date of Patent: Aug. 26, 2025

(54) SINGLE-CRYSTAL HIERARCHICAL PORE HZSM-5 MOLECULAR SIEVE AND ENVIRONMENT-FRIENDLY PREPARATION METHOD THEREOF

(71) Applicant: FUZHOU UNIVERSITY, Fuzhou (CN)

(72) Inventors: Yuanyuan Yue, Fuzhou (CN); Yuan Hu, Fuzhou (CN); Xiaojun Bao, Fuzhou (CN); Chan Wang, Fuzhou (CN); Tinghai Wang, Fuzhou (CN); Haibo Zhu, Fuzhou (CN)

(73) Assignee: Fuzhou University, Fuzhou (CN)

( * ) Notice: Subject to any disclaimer, the term of this patent is extended or adjusted under 35 U.S.C. 154(b) by 584 days.

(21) Appl. No.: 17/794,104

(22) PCT Filed: Mar. 10, 2021

(86) PCT No.: PCT/CN2021/079916
§ 371 (c)(1),
(2) Date: Jul. 20, 2022

(87) PCT Pub. No.: WO2022/165911
PCT Pub. Date: Aug. 11, 2022

(65) Prior Publication Data
US 2023/0183080 A1 Jun. 15, 2023

(30) Foreign Application Priority Data
Feb. 5, 2021 (CN) .......................... 202110162880.2

(51) Int. Cl.
*C01B 39/40* (2006.01)
(52) U.S. Cl.
CPC .......... *C01B 39/40* (2013.01); *C01P 2006/12* (2013.01); *C01P 2006/14* (2013.01); *C01P 2006/17* (2013.01)

(58) Field of Classification Search
CPC ..... C01B 39/40; C01B 39/48; C01P 2006/12; C01P 2006/14; C01P 2006/17; C01P 2002/72; C01P 2002/80
See application file for complete search history.

(56) References Cited

U.S. PATENT DOCUMENTS

2009/0326177 A1 12/2009 Ying et al.

FOREIGN PATENT DOCUMENTS

| CN | 101983921 A | 3/2011 |
| CN | 103007983 A | 4/2013 |

(Continued)

OTHER PUBLICATIONS

International Search Report and Written Opinion for PCT Patent Application No. PCT/CN2021/079916 dated Nov. 4, 2021, 8 pages (Official Language only).

*Primary Examiner* — Anthony J Zimmer
*Assistant Examiner* — Jaanzeb C Raja
(74) *Attorney, Agent, or Firm* — Olive Law Group, PLLC

(57) ABSTRACT

The present invention relates to the technical field of molecular sieves, in particular to a single-crystal hierarchical pore HZSM-5 molecular sieve and an environment-friendly preparation method thereof. The environment-friendly preparation method of the single-crystal hierarchical pore HZSM-5 molecular sieve includes the following steps: preparing a sample by a hydrothermal method with nitrogen-free polyketal as a template agent; and conducting acid treatment on the obtained sample to remove the template agent and to obtain the single-crystal hierarchical pore HZSM-5 molecular sieve. A mesopore diameter of the single-crystal hierarchical pore HZSM-5 molecular sieve is concentrated at 10 to 40 nm, a crystal grain size thereof is 30 to 500 nm, a specific surface area thereof is 360 to 450 m²/g, and a pore volume thereof is 0.32 to 0.42 cm³/g. The present application can not only solve the problems (Continued)

such as collapse of a molecular sieve structure caused by high-temperature roasting, emission of harmful gases and non-recyclability of the template agent, but also can shorten a preparation process of the HZSM-5 molecular sieve and reduce energy consumption and material consumption of the process; and the synthesized HZSM-5 molecular sieve has single-crystal hierarchical pores, and has the advantages of hydrothermal stability, high specific surface area, high pore volume and the like.

9 Claims, 3 Drawing Sheets

(56) References Cited

FOREIGN PATENT DOCUMENTS

| | | | |
|---|---|---|---|
| CN | 103896304 A | 7/2014 | |
| CN | 104261427 A | 1/2015 | |
| CN | 105000574 A | 10/2015 | |
| CN | 105600804 A | 5/2016 | |
| CN | 107777700 A * | 3/2018 | ............. B82Y 40/00 |

* cited by examiner

SINGLE-CRYSTAL HIERARCHICAL PORE HZSM-5 MOLECULAR SIEVE AND ENVIRONMENT-FRIENDLY PREPARATION METHOD THEREOF

TECHNICAL FIELD

The present invention relates to the technical field of molecular sieves, in particular to a single-crystal hierarchical pore HZSM-5 molecular sieve and an environment-friendly preparation method thereof.

BACKGROUND

A molecular sieve is a three-dimensional framework structure constructed by interconnecting $TO_4$ tetrahedra (where T is Si, Al, P, etc.). Its unique three-dimensional pore channel structure not only provides a spatial confinement effect for shape-selective catalysis, but also provides abundant diffusion channels for reactants and products. However, a micropore diameter of traditional molecular sieves is less than 2 nm, and its single micropore structure limits the diffusion ability of reactant molecules in pore channels. A hierarchical pore molecular sieve combines the advantage of higher catalytic activity of micropores with the advantage of faster mass transfer of mesopores in a single microporous material, and has the advantages of enhancing the mass transfer rate, converting within macromolecular pores and reducing the deactivation rate.

In the open literature (Science, 2011, 333, 328), for the first time, a bi-functional organic ammonium template agent that guides micropores and mesopores simultaneously is used to prepare an ordered mesoporous MR molecular sieve. In the open literature (Nature Communications, 2014, 5(1), 1-9), rigid azobenzene fragments are introduced into alkyl chain ends of a bi-functional organic ammonium template agent, and a highly ordered mesoporous MR molecular sieve is synthesized by stabilizing a micellar structure and blocking the growth of MR crystals in a b-axis direction. However, these ordered mesoporous molecular sieve particles usually have a polycrystalline structure, which has relatively poor hydrothermal stability compared to a single-crystal structure. In the open literature (Journal of the American Chemical Society, 2014, 136, 2503-2510), a single-crystal hierarchical pore Beta molecular sieve with through mesopores is prepared by using a cationic polymer as a bi-functional template agent. The molecular sieve with the single-crystal structure shows more excellent catalytic activity in a catalytic reaction due to its better hydrothermal stability.

In the template synthesis process of the above hierarchical pore molecular sieves, the bi-functional template agents used are organic substances containing ammonium and nitrogen, and are relatively expensive, and the synthesized molecular sieves need to be roasted at a high temperature to remove the template agents. Under the condition of a high temperature, pore channel structures of the molecular sieves are prone to being eroded by small molecular substances such as water and shrinks, and the structures of the template agents are damaged and cannot be recycled. Gases such as NOx and $CO_2$ emitted during the roasting process cause serious pollution to the environment.

In order to reduce the damage to the molecular sieve structure caused by high-temperature roasting, the open literature (Chemical Engineering Journal, 2018, 346, 600-605) reported for the first time that a template agent was removed by hydrocatalytic cracking at a temperature of 613 K, which was applied to removal of template agents of a beta molecular sieve and a TS-1 molecular sieve. A heterogeneous catalyst $Pd/SiO_2$ served as a main source of hydrogen overflow, and active hydrogen atoms overflowing between phases cracked the template agent into small molecular fragments. Although this method can effectively reduce the roasting temperature, the structure of the template agent is destroyed and cannot be recycled, and hydrogen gas and a catalyst need to be introduced and added respectively, which has high requirements for equipment, so the cost cannot be effectively reduced.

In order to replace roasting to remove template agents, some studies have used methods such as solvent extraction, supercritical carbon dioxide and dielectric barrier discharge to remove organic template agents from molecular sieves. CN102688608A discloses a method for recovering a mesoporous molecular sieve organic template agent, in which, a supercritical carbon dioxide method is used to extract and recover a P123 template agent in a Y molecular sieve, and a recovery rate of the template agent is more than 80%. Although this method can effectively remove and recycle the template agent, it has high requirements for equipment, supercritical carbon dioxide cannot be recycled, and the cost of industrial application is high. CN106145142A discloses a method for removing an organic template agent of a molecular sieve, in which, a dielectric barrier discharge technology is mainly adopted, $O_2$ is selected as plasma working gas, free radicals with extremely high oxidative activity are produced in a discharge process, and under actions of polymerization, substitution, electron transfer, bond breaking and the like between the free radicals and the organic template agent, the organic template agent is decomposed and leaves molecular sieve pore channels in a gaseous state without influencing a crystal structure of the molecular sieve. This method is successfully applied in the removal of a template agent of a beta molecular sieve containing a tetraethylammonium hydroxide organic template agent, but in this method, the template agent structure is destroyed, the template agent cannot be recycled, and the input of a dielectric barrier discharge device increases a preparation cost.

In addition, in the open literature (Nature, 2003, 425 (6956): 385-388), a ketal quaternary ammonium salt is used as a template agent to synthesize a microporous ZSM-5 molecular sieve. The ketal quaternary ammonium salt can be decomposed into small molecular fragments by acid treatment to be removed from a molecular sieve pore channel, but the template agent contains ammonium and nitrogen, and it is a non-environment-friendly organic matter. Moreover, due to a quaternary ammonium group is positively charged and has a relatively strong electrostatic force with a molecular sieve framework, in addition to acid treatment, ammonium-containing fragments need to be removed from the molecular sieve framework by ion exchange, and a removal process is relatively complicated. Moreover, a microporous molecular sieve synthesized by this method is prone to being deactivated by carbon deposition during the mass transfer process of macromolecules, and the application scope is limited. Therefore, this patent proposes an environment-friendly method for synthesis of a hierarchical pore molecular sieve without roasting to remove a template agent in one step by designing an ammonium-nitrogen-free polymer that guides micropores and mesopores simultaneously.

Technical Solutions

Aiming at solving the above problems, the present invention provides a single-crystal hierarchical pore HZSM-5 molecular sieve and an environment-friendly preparation method thereof.

The technical solution of the present invention to solve the problems is to provide an environment-friendly preparation method of a single-crystal hierarchical pore HZSM-5 molecular sieve, including the following steps:

A. preparing a sample by a hydrothermal method with nitrogen-free polyketal as a template agent; and
B. conducting acid treatment on the obtained sample to remove the template agent and to obtain the single-crystal hierarchical pore HZSM-5 molecular sieve.

Preparation of an HZSM-5 molecular sieve is usually as follows: first, organic amines, inorganic amines or alcohols are used as template agents to prepare a NaZSM-5 molecular sieve, then multiple exchanges are conducted with an aqueous solution of $NH_4NO_3$ to obtain $NH_4$-ZSM-5, and then roasting is conducted at a certain temperature, so that H-type ZSM-5 can be obtained. Acid treatment is generally not used, as the acid treatment will remove aluminum from the molecular sieve.

The inventor unexpectedly discovered nitrogen-free polyketal, which can also be used as a template agent. Meanwhile, this template agent can be decomposed and removed by acid. Compared with the aluminum in the molecular sieve, this template agent is easier to react with the acid, so that the influence of the acid on the molecular sieve itself is avoided while the template agent is decomposed and removed under acidic conditions. Through the template agent of the present application, a macromolecular polymer template agent can be decomposed into small molecules to be removed from a molecular sieve pore channel by only one step of acid treatment, and a removal process is simple; moreover, NaZSM-5 can be converted into HZSM-5 while the template agent is removed by acid, which avoids subsequent ammonium exchange or acid exchange processes, and shortens a preparation process of the HZSM-5 molecular sieve.

A hydroxyl group can guide synthesis of a ZSM-5 molecular sieve, so as a preference of the present invention, a terminal position of the template agent has a hydroxyl group.

Further as a preference of the present invention, a structural formula of the template agent is as follows:

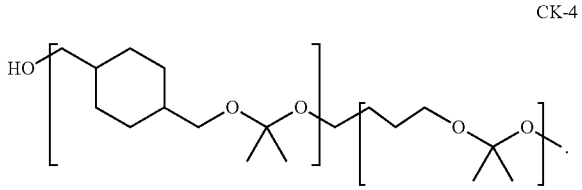

CK-4

The polyketal is an intelligent reactant that is stable under alkaline conditions and decomposed under acidic conditions. The polyketal has a structure that is stable under alkaline conditions for molecular sieve synthesis, and the polyketal can be used as a structure-directing agent and a steric inhibitor to synthesize a small crystal grain ZSM-5 molecular sieve.

The polyketal can be prepared by the following ways: 1,4-cyclohexanedimethanol (69.4 mmol) and 1,4-butanediol (17.34 mmol) are dissolved into 60 mL of freshly distilled cyclohexane, added into a 100 mL three-necked flask with a distilling head, and heated to 100° C. Recrystallized p-toluenesulfonic acid (0.0394 mmol) is dissolved into 7.0 mL of freshly distilled ethyl acetate and added into the above system. After the ethyl acetate is evaporated, 2,2-dimethoxypropane (10.66 mL, 86.6 mmol) is added dropwise into the above system. After reaction for 7 hours, 5 mL of 2,2-dimethoxypropane and 10 mL of cyclohexane are added every 5 hours, with 5 times. After the addition is completed, the reaction is carried out for 5 hours. After the system is cooled to a room temperature, 4 mL of triethylamine is added to terminate the reaction. An obtained liquid is added to cold n-hexane (−20° C.), and an obtained solid is filtered and dried to obtain a polyketal product.

In the present application, a hydrothermal method is used to first prepare a sample, which includes NaZSM-5. During preparation of NaZSM-5 by the hydrothermal method, different crystallization temperatures and time will affect a structure of a final molecular sieve. Therefore, as a preference of the present invention, Step A includes the following steps: a. mixing water, an aluminum source and the template agent evenly, and then adding a silicon source in batches to obtain a gel; b. aging the gel for 2 to 4 hours at 20° C. to 30° C. and then placing the gel in a reaction kettle to be crystallized for 1 to 10 days at 120° C. to 200° C.; c. after crystallization is completed, filtering and drying an obtained solid product to obtain a sample.

As a preference of the present invention, the gel includes, in parts by molar, 20 to 60 parts of $H_2O$, 1 part of $SiO_2$, 0.001 to 0.05 part of $Al_2O_3$, 0.05 to 0.5 part of $Na_2O$, and 0.01 to 0.06 part of the template agent. Preferably, $Al_2O_3$ is 0.001 to 0.04 part.

As a preference of the present invention, the aluminum source includes one or more of sodium metaaluminate, aluminum sulfate, kaolin, and rectorite.

As a preference of the present invention, the silicon source includes one or more of silica sol, tetraethoxysilane, white carbon black, and diatomite.

In order to further guide molecular sieve synthesis, as a preference of the present invention, in Step a, an alkali source may also be added. As a preference of the present invention, the alkali source is selected from sodium hydroxide.

As a preference of the present invention, in Step B, an acid treatment agent used for the acid treatment includes one or more of hydrochloric acid, sulfuric acid or acetic acid. A temperature of the acid treatment is 60° C. to 100° C., and acid treatment time is 2 to 12 hours.

Another object of the present invention is to provide a single-crystal hierarchical pore HZSM-5 molecular sieve. A mesopore diameter of the single-crystal hierarchical pore HZSM-5 molecular sieve is concentrated at 10 to 40 nm, a crystal grain size thereof is 30 to 500 nm, a specific surface area thereof is 360 to 450 $m^2/g$, and a pore volume thereof is 0.32 to 0.42 $cm^3/g$.

Beneficial Effects

1. Nitrogen-free polyketal used in the present application is used as a template agent, so that a synthesized single-crystal hierarchical pore HZSM-5 molecular sieve can remove the template agent without high-temperature roasting, thereby avoiding emission of harmful gases NOx and $CO_2$ and damage to a crystal structure of the molecular sieve caused by high-temperature roasting.
2. In the present application, a macromolecular polymer can be decomposed into small molecules to be removed from a molecular sieve pore channel by only one step of acid treatment, and a removal process is simple; moreover, NaZSM-5 can be converted into HZSM-5 while the macromolecular polymer is removed by acid, which avoids subsequent ammonium exchange or acid exchange processes, and shortens a preparation process of the HZSM-5 molecular sieve.

3. The small molecules produced in an acid decomposition process of the present application can be used as raw materials to further synthesize polyketal, so that the template agent can be recycled repeatedly, which reduces a cost and improves an atom utilization rate.

4. By adopting a method of the present application, not only can a ZSM-5 molecular sieve product with a low silicon-to-aluminum ratio be synthesized, but also a ZSM-5 molecular sieve with medium and high silicon-to-aluminum ratios can be synthesized, that is, they have a wider synthesis phase region than a template-agent-free method.

5. Compared with conventional molecular sieves, the HZSM-5 molecular sieve synthesized by the method of the present application has a single crystal property, a higher specific surface area (360 to 450 $m^2/g$) and a higher pore volume (0.32 to 0.42 $cm^3/g$). Moreover, there is a mesoporous structure, and a mesopore diameter thereof is 10 to 40 nm, that is, the HZSM-5 molecular sieve synthesized by the method of the present invention is a single-crystal hierarchical pore molecular sieve.

DETAILED DESCRIPTION OF EMBODIMENTS

Figure 1:
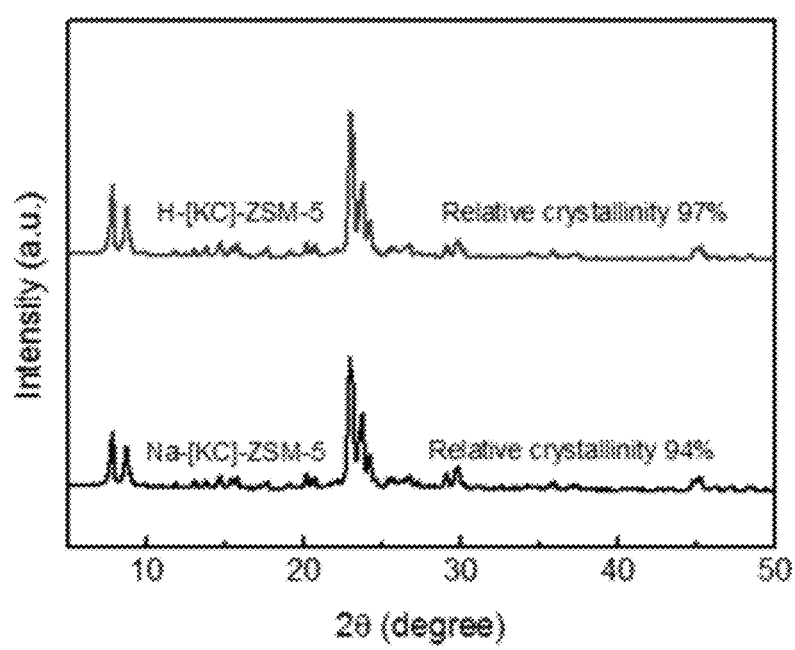
FIG. 1 is an XRD diffractogram of a single-crystal hierarchical pore HZSM-5 molecular sieve prepared in Example 1.

The followings are specific embodiments of the present invention, and in conjunction with the accompanying drawings, the technical solutions of the present invention are further described, but the present invention is not limited to these examples.

It needs to be noted that the relative crystallinity described in examples of the present application is a ratio of sums of characteristic peak areas of 2θ between 22.5o-25.0o in XRD spectrums of an obtained product and a ZSM-5 molecular sieve standard sample according to ASTM D 3906-03 standards, and is expressed as a percentage. The standard sample is a ZSM-5 molecular sieve with a silicon-alumina ratio of 38.0 produced by Nankai University Catalyst Co., Ltd., and its crystallinity is defined as 100%.

Example 1

A single-crystal hierarchical pore HZSM-5 molecular sieve was prepared by the following steps.

A. A sample was prepared by a hydrothermal method with nitrogen-free polyketal as a template agent.

The nitrogen-free polyketal was prepared by the following steps: 1,4-cyclohexanedimethanol (69.4 mmol) and 1,4-butanediol (17.34 mmol) were dissolved into 60 mL of freshly distilled cyclohexane, added into a 100 mL three-necked flask with a distilling head, and heated to 100° C. Recrystallized p-toluenesulfonic acid (0.0394 mmol) was dissolved into 7.0 mL of freshly distilled ethyl acetate and added into the above system. After the ethyl acetate was evaporated, 2,2-dimethoxypropane (10.66 mL, 86.6 mmol) was added dropwise into the above system. After reaction for 7 hours, 5 mL of 2,2-dimethoxypropane and 10 mL of cyclohexane were added every 5 hours, with 5 times. After the addition was completed, the reaction was carried out for 5 hours. After the system was cooled to a room temperature, 4 mL of triethylamine was added to terminate the reaction. An obtained liquid was added to cold n-hexane (−20° C.), and an obtained solid was filtered and dried to obtain a polyketal product, namely the template agent.

Preparation of the sample by the hydrothermal method: 0.111 g of $NaAlO_2$ and 0.159 g of NaOH were dissolved in 13.5 mL of water to form a clear solution, and then 0.64 g of the above template agent was added into the clear solution. After even stirring, 0.935 g of white carbon black was added. A feeding molar ratio met: 1 ($SiO_2$):0.043 ($Al_2O_3$):0.0164 (template agent): 0.171 ($Na_2O$):48.08 ($H_2O$). After aging for 2 hours at 25° C., a gel was transferred into a stainless steel reaction kettle with a polytetrafluoroethylene lining and placed in a 160° C. homogeneous reactor to be crystallized for 120 hours. A product was centrifuged, washed and then dried at 100° C. to obtain a solid sample.

An XRD diffractogram of the sample was shown in FIG. 1 (Na-[KC]-ZSM-5 curve), a phase thereof is determined by XRD to belong to a ZSM-5 molecular sieve, and a relative crystallinity thereof was 94%.

B. Acid treatment was conducted on the obtained sample to remove the template agent and to obtain the single-crystal hierarchical pore HZSM-5 molecular sieve.

0.2 g of the above solid sample was weighed to be added into 25 mL of hydrochloric acid with a concentration of 1 mol/L. Stirring was conducted for 12 hours at 80° C. An obtained product was centrifuged, fully washed with deionized water until neutral, and finally dried in a 110° C. oven to obtain a product.

An XRD diffractogram of the product was shown in FIG. 1 (H-[KC]-ZSM-5 curve), a phase thereof is determined by XRD to belong to a ZSM-5 molecular sieve, and a relative crystallinity thereof was 97%.

Figure 2:
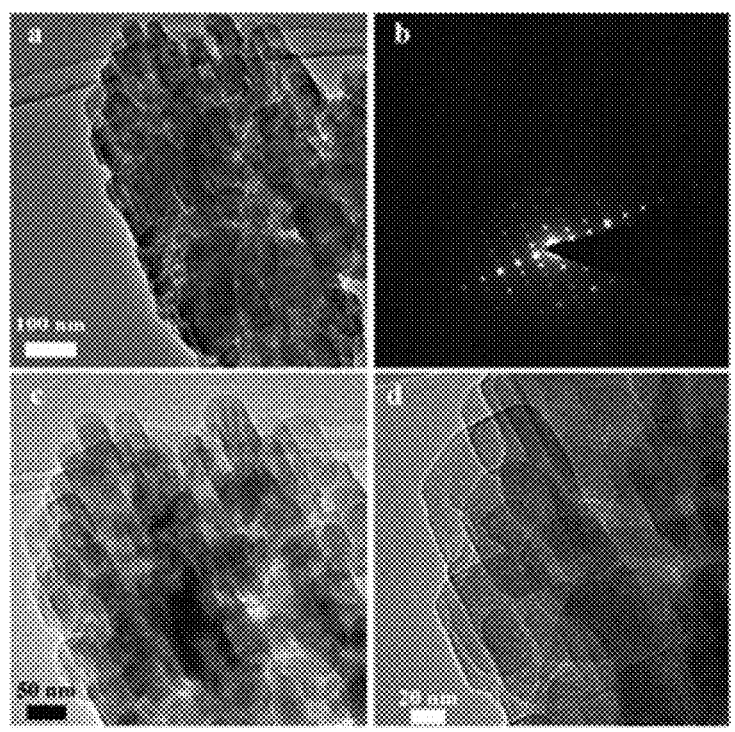
FIG. 2 is transmission electron microscope diagrams (a, c, d) and an electronogram (b) of the single-crystal hierarchical pore HZSM-5 molecular sieve prepared in Example 1.

As shown in FIG. 2, TEM characterized that the product was an aggregate (a) aggregated by crystal grains with a size of about 60 nm. From an electronogram (b) of a whole particle, it could be seen that the whole grain was a single-crystal structure. In FIG. 2 (c, d), orientation of lattice fringes of a single grain was the same, and each crystal grain was a single-crystal structure.

Figure 3:
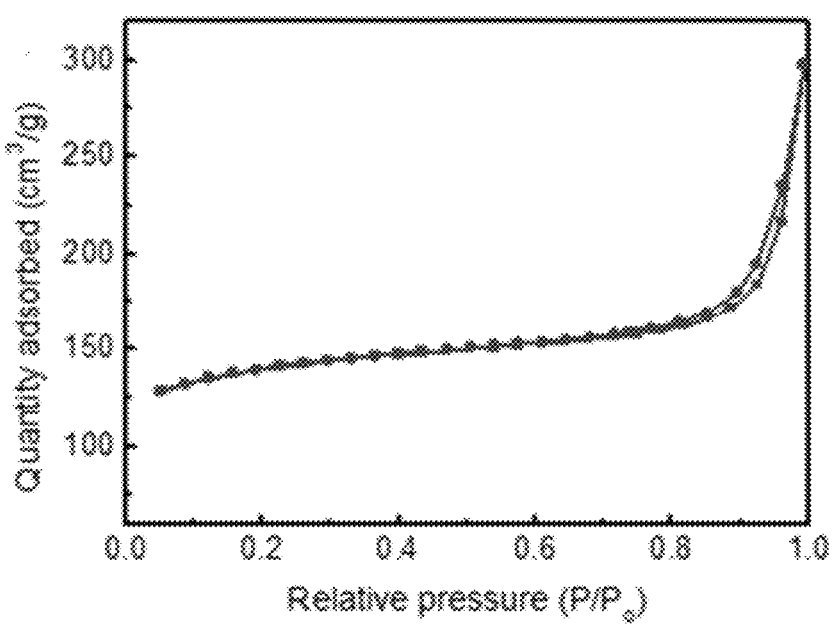
FIG. 3 shows N2 adsorption and desorption curves of the single-crystal hierarchical pore HZSM-5 molecular sieve prepared in Example 1.

As shown in FIG. 3, a diagram of N2 adsorption and desorption curves contains both I and IV type characteristic adsorption curves, and a H3-type hysteresis loop appeared in a high pressure region, indicating that a product was a hierarchical pore molecular sieve with micropores and mesoporous channels.

Figure 4:
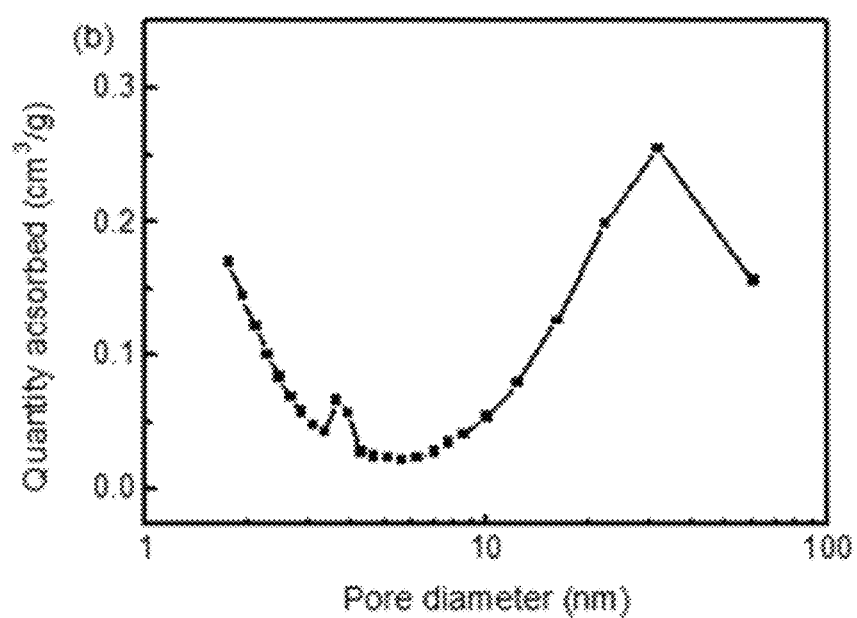
FIG. 4 is a pore diameter distribution diagram of the single-crystal hierarchical pore HZSM-5 molecular sieve prepared in Example 1.

As shown in FIG. 4, in a pore diameter distribution diagram, a mesopore diameter was concentrated at 31.6 nm, a specific surface area was 432 $m^2/g$, and a pore volume was 0.42 $cm^3/g$.

Example 2

A single-crystal hierarchical pore HZSM-5 molecular sieve was prepared by the following steps.

A. A sample was prepared by a hydrothermal method with nitrogen-free polyketal as a template agent.

Preparation of the sample by the hydrothermal method: the template agent prepared in Example 1 was used, sodium metaaluminate and aluminum sulfate were used as an aluminum source, and tetraethoxysilane was used as a silicon source. After the aluminum source and sodium hydroxide were dissolved in water to form a clear solution, the template agent was added into the clear solution. After even stirring, the silicon source was added. The amount of addition was adjusted to make a feeding molar ratio meet: 1 ($SiO_2$):0.025 ($Al_2O_3$):0.0328 (template agent):0.264 ($Na_2O$):25 ($H_2O$). After aging for 4 hours at 25° C., a gel was transferred into a stainless steel reaction kettle with a polytetrafluoroethylene lining and placed in a 190° C. homogeneous reactor to be crystallized for 48 hours. A product was centrifuged, washed and then dried at 100° C. to obtain a solid sample.

B. Acid treatment was conducted on the obtained sample to remove the template agent and to obtain the single-crystal hierarchical pore HZSM-5 molecular sieve.

0.2 g of the above sample was weighed to be added into 25 mL of sulfuric acid with a concentration of 1 mol/L. Stirring was conducted for 4 hours at 95° C. An obtained product was centrifuged, fully washed with deionized water until neutral, and finally dried in a 110° C. oven to obtain a product.

A phase of the product is determined by XRD to belong to a ZSM-5 molecular sieve, and a relative crystallinity thereof was 110%, a crystal grain size thereof was about 90 nm, a mesopore diameter thereof was concentrated at 15 nm, a specific surface area thereof was 392 m$^2$/g, and a pore volume thereof was 0.36 cm$^3$/g.

Example 3

A single-crystal hierarchical pore HZSM-5 molecular sieve was prepared by the following steps.

A. A sample was prepared by a hydrothermal method with nitrogen-free polyketal as a template agent.

Preparation of the sample by the hydrothermal method: the template agent prepared in Example 1 was used, aluminum sulfate was used as an aluminum source, and silica sol and white carbon black were used as a silicon source. After the aluminum source and sodium hydroxide were dissolved in water to form a clear solution, the template agent was added into the clear solution. After even stirring, the silicon source was added. The amount of addition was adjusted to make a feeding molar ratio meet: 1 ($SiO_2$):0.01 ($Al_2O_3$):0.055 (template agent):0.08 ($Na_2O$):35 ($H_2O$). After aging for 3 hours at 25° C., a gel was transferred into a stainless steel reaction kettle with a polytetrafluoroethylene lining and placed in a 130° C. homogeneous reactor to be crystallized for 240 hours. A product was centrifuged, washed and then dried at 100° C. to obtain a solid sample.

B. Acid treatment was conducted on the obtained sample to remove the template agent and to obtain the single-crystal hierarchical pore HZSM-5 molecular sieve.

0.2 g of the above solid sample was weighed to be added into 25 mL of acetic acid with a concentration of 1 mol/L. Stirring was conducted for 8 hours at 70° C. An obtained product was centrifuged, fully washed with deionized water until neutral, and finally dried in a 110° C. oven to obtain a product.

A phase of the product is determined by XRD to belong to a ZSM-5 molecular sieve, and a relative crystallinity thereof was 95%, a crystal grain size thereof was about 110 nm, a mesopore diameter thereof was concentrated at 12 nm, a specific surface area thereof was 373 m$^2$/g, and a pore volume thereof was 0.35 cm$^3$/g.

Example 4

A single-crystal hierarchical pore HZSM-5 molecular sieve was prepared by the following steps.

A. A sample was prepared by a hydrothermal method with nitrogen-free polyketal as a template agent.

Preparation of the sample by the hydrothermal method: the template agent prepared in Example 1 was used, commercially available kaolin was used as an aluminum source, and commercially available diatomite was used as a silicon source. In particular, the kaolin was mainly composed of 53.14 wt. % of $SiO_2$ and 44.11 wt. % of $Al_2O_3$. Before use, the kaolin needs to be pretreated as follows: 12.00 g of the kaolin was weighed, 16.00 g of sodium hydroxide was added to be mixed evenly, 64.00 g of deionized water was added, and drying was conducted at 200° C. for standby application. The diatomite was mainly composed of 95.35 wt. % of $SiO_2$ and 2.67 wt. % of $Al_2O_3$. Before use, the diatomite also needs to be pretreated as follows: 20.00 g of the diatomite was weighed, and roasted for 4 hours at 600° C. for standby application.

0.068 g of NaOH was dissolved in 19.53 mL of water to form a clear solution. After even stirring, 0.423 g of the pretreated kaolin was added, and then 0.933 g of the template agent was added. After even stirring, 1.32 g of the pretreated diatomite was added. A feeding molar ratio met: 1 ($SiO_2$):0.043 ($Al_2O_3$):0.0164 (template agent):0.171 ($Na_2O$):48.08 ($H_2O$). After aging for 2 hours at 25° C., a gel was transferred into a stainless steel reaction kettle with a polytetrafluoroethylene lining and placed in a 160° C. homogeneous reactor to be crystallized for 120 hours. A product was centrifuged, washed and then dried at 100° C. to obtain a solid sample.

B. Acid treatment was conducted on the obtained sample to remove the template agent and to obtain the single-crystal hierarchical pore HZSM-5 molecular sieve.

0.2 g of the above solid sample was weighed to be added into 25 mL of hydrochloric acid with a concentration of 1 mol/L. Stirring was conducted for 12 hours at 80° C. An obtained product was centrifuged, fully washed with deionized water until neutral, and finally dried in a 110° C. oven to obtain a product.

A phase of the product is determined by XRD to belong to a ZSM-5 molecular sieve, and a relative crystallinity thereof was 97%, a crystal grain size thereof was about 80 nm, a mesopore diameter thereof was concentrated at 25 nm, a specific surface area thereof was 440 m$^2$/g, and a pore volume thereof was 0.40 cm$^3$/g.

Example 5

A single-crystal hierarchical pore HZSM-5 molecular sieve was prepared by the following steps.

A. A sample was prepared by a hydrothermal method with nitrogen-free polyketal as a template agent.

Preparation of the sample by the hydrothermal method: the template agent prepared in Example 1 was used, 0.111 g of $NaAlO_2$ and 0.159 g of NaOH were dissolved in 13.5 mL of water to form a clear solution, and then 0.64 g of the above template agent was added into the clear solution. After even stirring, 0.935 g of white carbon black was added. A feeding molar ratio met: 1 ($SiO_2$): 0.001 ($Al_2O_3$):0.0164 (template agent):0.171 ($Na_2O$):48.08 ($H_2O$). After aging for 2 hours at 25° C., a gel was transferred into a stainless steel reaction kettle with a polytetrafluoroethylene lining and placed in a 160° C. homogeneous reactor to be crystallized for 120 hours. A product was centrifuged, washed and then dried at 100° C. to obtain a solid sample.

B. Acid treatment was conducted on the obtained sample to remove the template agent, and meanwhile the single-crystal hierarchical pore HZSM-5 molecular sieve was obtained.

0.2 g of the above solid sample was weighed to be added into 25 mL of hydrochloric acid with a concentration of 1 mol/L. Stirring was conducted for 12 hours at 80° C. An obtained product was centrifuged, fully washed with deionized water until neutral, and finally dried in a 110° C. oven to obtain a product.

A phase of the product is determined by XRD to belong to a ZSM-5 molecular sieve, and a relative crystallinity thereof was 105%, a crystal grain size thereof was about 200 nm, a mesopore diameter thereof was concentrated at 38 nm, a specific surface area thereof was 410 m²/g, and a pore volume thereof was 0.39 cm³/g.

Comparative Example 1

This comparative example was basically the same as Example 1, and the difference only lied in that: no template agent was added in this comparative example.

A phase of a product prepared in this comparative example was determined by XRD to belong to a mixture of mordenite and a ZSM-5 molecular sieve.

Comparative Example 2

This comparative example was basically the same as Example 2, and the difference only lied in that: no template agent was added in this comparative example.

A phase of a product prepared in this comparative example was determined by XRD to belong to a ZSM-5 molecular sieve, and a relative crystallinity thereof was 80%, a crystal grain size thereof was about 2.5 µm, a specific surface area thereof was 330 m²/g, a pore volume thereof was 0.23 cm³/g, and there was no mesopore diameter distribution.

Comparative Example 3

This comparative example was basically the same as Example 1, and the difference only lied in that: in this comparative example, polyketal PK3 was selected as a template agent, and meanwhile, the amount of addition of raw materials was adjusted to make a feeding molar ratio meet: 1 (SiO₂):0.0125 (Al₂O₃):0.0164 (PK3):0.171 (Na₂O): 48.08 (H₂O).

A phase of a product prepared in this comparative example was determined by XRD to belong to a ZSM-5 molecular sieve, and a relative crystallinity thereof was 83%, a crystal grain size thereof was about 5.0 µm, a specific surface area thereof was 310 m²/g, a pore volume thereof was 0.21 cm³/g, and there was no mesopore diameter distribution.

Comparative Example 4

This comparative example was basically the same as Example 3, and the difference only lied in that: no template agent was added in this comparative example.

A phase of a product prepared in this comparative example was determined by XRD to be amorphous.

The above examples and comparative examples show that by using nitrogen-free polyketal as a template agent, a single-crystal hierarchical pore HZSM-5 molecular sieve with a high crystallinity, a high specific surface area and a high pore volume can be synthesized within an interval where the feeding n(SiO₂)/n(Al₂O₃) is 23 to 1000. Without adding polyketal, an HZSM-5 molecular sieve can be synthesized only when the feeding n(SiO₂)/n(Al₂O₃) is 40 and 80, but a relative crystallinity, a specific surface area and a pore volume of a product are all low, and there is no mesopore diameter distribution. When the feeding n(SiO₂)/n(Al₂O₃) is lower than 40 and higher than 80, a pure phase HZSM-5 molecular sieve cannot be synthesized. It can be seen from this that the addition of polyketal makes a wider ZSM-5 synthesis phase region, and the polyketal in a molecular sieve can be removed by simple acid treatment, without the need to roast a sample at a high temperature. Meanwhile, NaZSM-5 can also be converted into an HZSM-5 molecular sieve, and the obtained HZSM-5 molecular sieve has a smaller grain size, a high specific surface area and a high pore volume.

The specific embodiments described herein are merely illustrative of the spirit of the present invention. Those skilled in the art to which the present invention pertains can make various amendments or additions to the described specific embodiments or substitute them in similar manners, but it will not deviate from the spirit of the present invention or go beyond the scope defined by the appended claims.

The invention claimed is:

1. An environment-friendly preparation method of a single-crystal hierarchical pore HZSM-5 molecular sieve, comprising the following steps:
   A. preparing a sample by a hydrothermal method with nitrogen-free polyketal as a template agent; and
   B. conducting acid treatment on the obtained sample to remove the template agent and to obtain the single-crystal hierarchical pore HZSM-5 molecular sieve.

2. The environment-friendly preparation method of the single-crystal hierarchical pore HZSM-5 molecular sieve according to claim 1, wherein a terminal position of the template agent has a hydroxyl group.

3. The environment-friendly preparation method of the single-crystal hierarchical pore HZSM-5 molecular sieve according to claim 2, wherein a structural formula of the template agent is as follows:

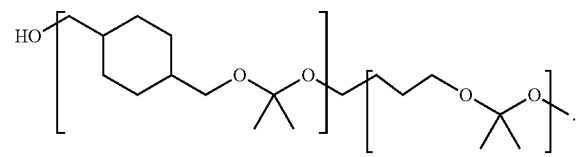

CK-4

4. The environment-friendly preparation method of the single-crystal hierarchical pore HZSM-5 molecular sieve according to claim 1, wherein an acid treatment agent used for the acid treatment comprises one or more of hydrochloric acid, sulfuric acid or acetic acid.

5. The environment-friendly preparation method of the single-crystal hierarchical pore HZSM-5 molecular sieve according to claim 1, wherein a temperature of the acid treatment is 60° C. to 100° C., and acid treatment time is 2 to 12 hours.

6. The environment-friendly preparation method of the single-crystal hierarchical pore HZSM-5 molecular sieve according to claim 1, wherein the Step A comprises the following steps: a. mixing water, an aluminum source and the template agent evenly, and then adding a silicon source in batches to obtain a gel; b. aging the gel for 2 to 4 hours at 20° C. to 30° C. and then placing the gel in a reaction kettle to be crystallized for 1 to 10 days at 120° C. to 200° C.; c. after crystallization is completed, filtering and drying an obtained solid product to obtain a sample.

7. The environment-friendly preparation method of the single-crystal hierarchical pore HZSM-5 molecular sieve according to claim 6, wherein the gel comprises, in parts by molar, 20 to 60 parts of H2O, 1 part of $SiO_2$, 0.001 to 0.05 part of $Al_2O_3$, 0.05 to 0.5 part of $Na_2O$, and 0.01 to 0.06 part of the template agent.

8. The environment-friendly preparation method of the single-crystal hierarchical pore HZSM-5 molecular sieve according to claim 6, wherein the aluminum source comprises one or more of sodium metaaluminate, aluminum sulfate, kaolin, and rectorite.

9. The environment-friendly preparation method of the single-crystal hierarchical pore HZSM-5 molecular sieve according to claim 6, wherein the silicon source comprises one or more of silica sol, tetraethoxysilane, white carbon black, and diatomite.

* * * * *